No. 701,382. Patented June 3, 1902.
J. PATTEN.
DEVICE FOR INDICATING THE RATE OF FLOW OF FLUIDS.
(Application filed Dec. 5, 1900.)
(No Model.)
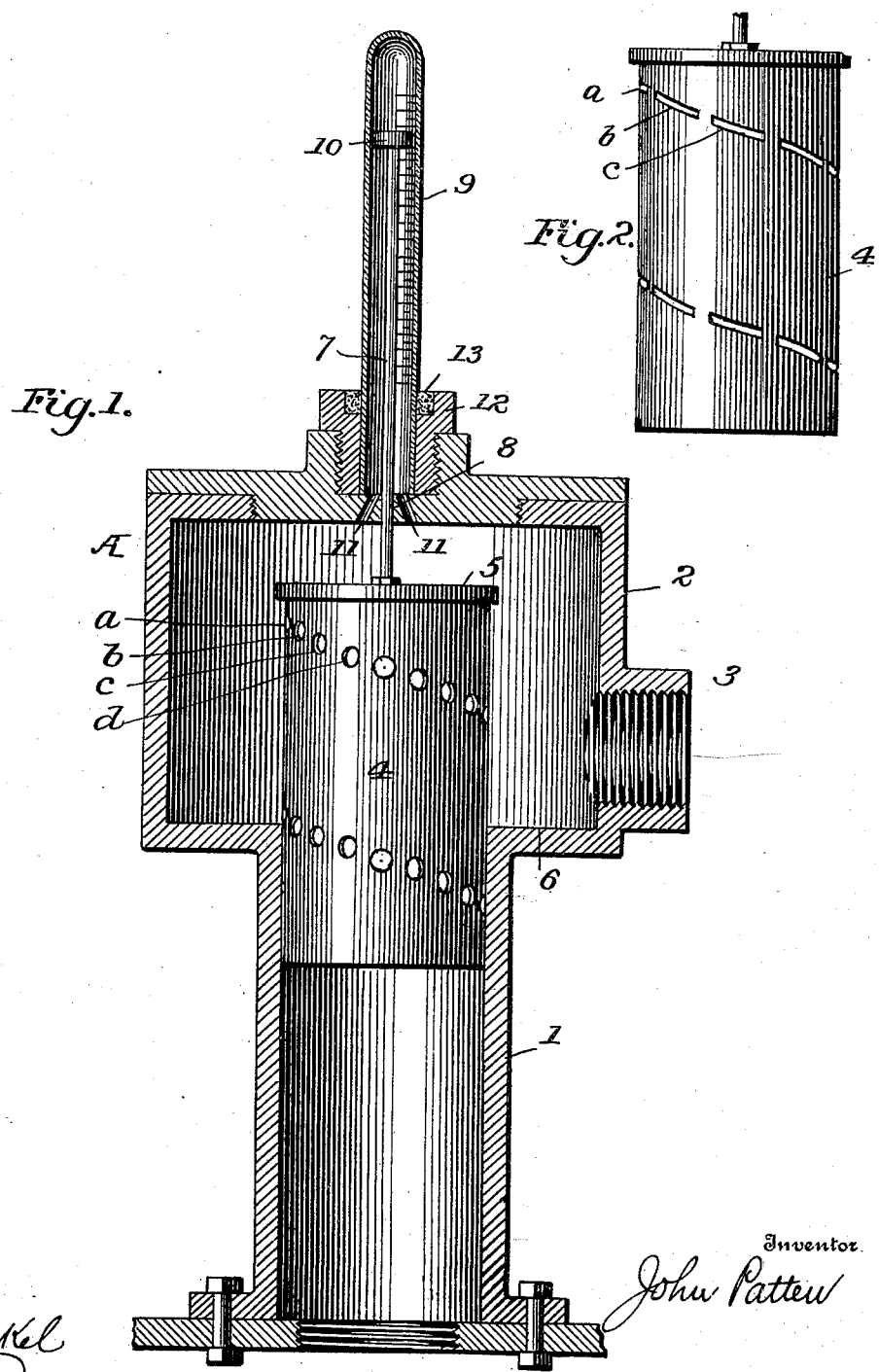

United States Patent Office.

JOHN PATTEN, OF BALTIMORE, MARYLAND, ASSIGNOR TO PATTEN VACUUM ICE MACHINE COMPANY, (SUCCESSOR TO THE HOME ICE MACHINE COMPANY,) OF BALTIMORE, MARYLAND, A CORPORATION OF WEST VIRGINIA.

DEVICE FOR INDICATING THE RATE OF FLOW OF FLUIDS.

SPECIFICATION forming part of Letters Patent No. 701,382, dated June 3, 1902.

Application filed December 5, 1900. Serial No. 38,828. (No model.)

*To all whom it may concern:*

Be it known that I, JOHN PATTEN, a citizen of the United States, residing at Baltimore, in the State of Maryland, have invented certain new and useful Improvements in Devices for Indicating the Rate of Flow of Fluids, of which the following is a specification.

The object of my invention is to provide a simple device for indicating the rate of flow of fluids in pipes.

The invention is designed particularly for use in connection with ice-machines in which the water is frozen as rapidly as it is fed into the freezing-tanks and in which it is essential to have the rate of flow of the liquid under observation and control at all times; but it will be found equally serviceable for indicating the rate of flow of fluids in any pipe system.

In the accompanying drawings, which illustrate my invention, Figure 1 is a vertical central section through a device embodying my invention, and Fig. 2 is a side view of a modified form of piston for use in connection with the same.

In the drawings, A indicates a casing comprising a lower vertical cylindrical portion 1 and a chamber 2 of larger diameter above said cylinder. The lower end of the cylindrical portion is open and adapted to be connected to the pipe system, from whence the fluid to be measured flows, and its upper end opens into the bottom of the chamber 2, as shown. Said chamber is provided with a suitable outlet or pipe connection 3, and the casing thus forms a part of the pipe system. Within the casing is arranged a hollow piston 4, said piston being closed at its upper end by a laterally-projecting cap 5 and being left open at its lower end. This piston fits closely within the cylinder 1 and is movable into and out of the chamber 2. The walls of the piston are formed with a series of spirally-arranged openings *a b c*, &c., extending downwardly from its closed end, said openings being of equal size and spaced at equal distances apart. The laterally-projecting cap 5 forms a stop which abuts against the bottom wall 6 of the chamber and limits the downward movement of the piston. An indicating-rod 7 is attached to the piston-head and projects upwardly therefrom through a small opening 8 in the casing into a vertically-arranged graduated glass tube 9, arranged upon the top of the casing, said tube being sealed at its outer end. A disk or index 10 is arranged upon the top of the rod 7 to indicate the elevation of the latter upon the graduation-marks of the tube, and suitable vent-holes 11 extend from the interior of the tube through the top of the casing into the chamber, so that the movement of the piston will not be retarded by liquid entering and remaining within the tube. The tube, as shown, is secured in place in a liquid-tight manner by a nut 12, having a recess in its upper end, within which is placed sealing-wax or cement 13.

When no fluid is passing through the device, the piston remains in its lowermost position, with its projecting shoulder resting upon the bottom wall 6 of the chamber. When the fluid is turned on, it enters the lower end of the cylinder 1, and thence passes into the interior of the piston, raising the latter until a sufficient number of the openings *a b c*, &c., rise above the bottom of the upper chamber to permit the water to flow outward freely into said chamber, and thence through the outlet 3. It will be apparent that as the volume of fluid passing into the cylinder is increased the upward pressure on the piston will be temporarily increased and the latter will rise to a point where a sufficient number of openings are disclosed to permit the fluid to pass freely through into the chamber, and that as the volume decreases the piston will fall a distance proportionate to the decrease in volume, leaving only a sufficient number of openings above the base to permit the fluid to pass freely through. As the indicating-rod is connected to the piston, it will rise and fall with the latter, and the volume of fluid passing at any given time may be ascertained by observing the position of the index upon the scale. As the openings *a b c*, &c., are arranged spirally of the piston and at such distances apart longitudinally thereof that before one opening is raised entirely above the base 6 the succeeding opening will rise partly above the base, the movement of the piston will correspond very closely to the increase or decrease in the flow of fluid. The spiral arrangement of the openings also permits the fluid to escape on all sides of the piston in small streams, which do not interfere with one another.

In Fig. 1 I have shown round openings in the piston; but they may be made in the form of slots, as shown in Fig. 2, or of any other desirable shape, the openings being so arranged and proportioned that the combined area of the openings uncovered at any time will be proportionate to the height of the piston above the base of the upper chamber.

Having thus described my invention, what I claim as new, and desire to secure by Letters Patent, is—

1. In a device for measuring the flow of fluids, the combination with a casing having a passage-way for the fluid, of a hollow piston extending into said passage-way and movable longitudinally therein, said piston being open at its inner end and closed at its outer end and having a series of openings in its walls, the consecutive openings in the series being in different positions longitudinally and circumferentially of the piston, and an indicating device operated by the piston for indicating the position of the latter.

2. In a device for measuring the flow of fluids, the combination with a casing having a passage-way for the fluid of a hollow piston extending into said passage-way and movable longitudinally therein, said piston being open at its inner end and closed at its outer end and having a series of openings in its walls, the consecutive openings in the series being in different positions circumferentially and longitudinally of the piston and at such distances apart longitudinally thereof that the bottom of each opening extends below the top of the opening next in succession, and an indicating device operated by the piston for indicating the position of the latter.

3. In a device for measuring the flow of fluids, the combination with a cylinder through which the fluid passes, of a hollow piston extending into the cylinder and movable longitudinally therein, said piston being open at its inner end and closed at its outer end, and having a series of spirally-arranged openings in its walls, and an indicating device operated by the piston for indicating the position of the latter.

4. In a device for measuring the flow of fluids, the combination with a vertically-arranged cylinder through which the fluid passes and an enlarged chamber at the upper end of said cylinder, said chamber having an outlet, of a hollow piston arranged within the cylinder and adapted to move outwardly into the chamber, said piston being open at its inner end and closed at its outer end and having a series of spirally-arranged openings in its walls, and an indicating-rod connected to said piston and extending through an opening in the walls of the casing.

In testimony whereof I affix my signature in presence of two witnesses.

JOHN PATTEN.

Witnesses:
FELIX R. SULLIVAN,
LOUIS A. KATZENBERGER.